Oct. 7, 1958  A. E. R. ARNOT  2,855,119
GOODS LIFTING TRUCKS
Filed Feb. 7, 1955  3 Sheets-Sheet 1

INVENTOR
Alfred E. R. Arnot
By Watson, Cole, Grindle & Watson
ATTORNEYS

Oct. 7, 1958 A. E. R. ARNOT 2,855,119
GOODS LIFTING TRUCKS
Filed Feb. 7, 1955 3 Sheets-Sheet 3

INVENTOR
Alfred E. R. Arnot
By Watson, Cole, Grindle & Watson
ATTORNEYS

United States Patent Office 2,855,119
Patented Oct. 7, 1958

2,855,119

GOODS LIFTING TRUCKS

Alfred Erwin Reginald Arnot, Basingstoke, England, assignor to Emmanuel Kaye and John Reginald Sharp, both of Basingstoke, England Application February 7, 1955, Serial No. 486,616

Claims priority, application Great Britain February 8, 1954

4 Claims. (Cl. 214—672)

This invention comprises improvements in or relating to goods lifting trucks.

The invention particularly relates to battery driven masted trucks, that is to trucks which have masts up and down which a carriage can travel for lifting and lowering goods supported by the carriage. Such trucks are used in works for stacking goods in storage, especially goods which are supported on pallets, and in order to facilitate operation of the truck in confined spaces, it is desirable to reduce its length as much as possible. On battery driven trucks space has to be provided on the vehicle for a power unit at one end, in addition to room for the battery, for the mast, for the carriage working thereon, and for the goods lifted thereby. As the space for the goods is the prime requirement, the problem of reducing the length of the truck is therefore one of reducing that afforded lengthwise for the other items, and offers considerable difficulty especially as the width and overall height must also be kept to a minimum.

Hitherto, in trucks of this kind, either the battery and the power unit have been located side by side at the back of the vehicle immediately behind the mast, in which case the operator must walk behind the truck (in which case control from the side of the truck in confined spaces offers a problem), or the battery has been disposed between the power unit and the mast, an arrangement which allows the operators to stand on the truck, but lengthens the truck by the amount of the fore-and-aft dimension of the battery and its case.

According to the present invention, the lower part of the mast structure is made of two separate columns which afford a space between them adequate to receive the battery, and the carriage on the mast is designed so that its connecting members for engagement with the mast structure extend rearwardly from the main part of the carriage to the masts close to the inside of each mast without materially encroaching on the battery space between the masts, the battery being located in this space and made of such dimensions as to leave adequate clearance for the carriage connecting members. In this way the carriage is able to run up and down the whole length of the mast which carries it, without fouling the battery and the fore-and-aft length of the mast structure is utilised also for battery space.

In a preferred construction, there is an extensible mast in two sections, the liftable section being disposed in front of the fixed section and connected therewith by flat roller-carrying brackets which occupy the minimum of width in the vehicle, while the carriage is mounted on the movable section of the mast by means of similar narrow brackets, the lifting gear being disposed above the battery case which occupies the lower portion of the space between the masts.

The following is a description by way of example of a truck in accordance with the invention:

In the accompanying drawings

Figure 1:
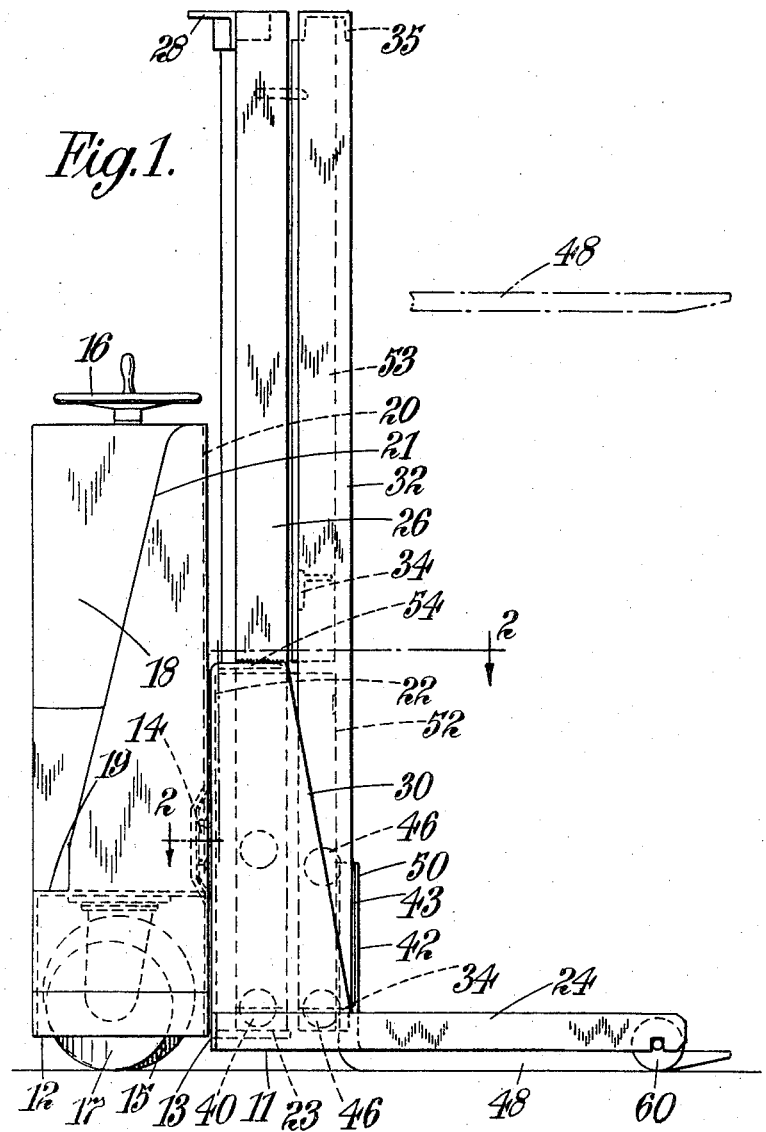
Figure 1 is a side elevation of the truck.

The truck as shown is of the type which comprises a forward mast-carrying section 11 and a rearward propelling section 12 which are joined together where they meet at a vertical plane 13 by a pivot assembly 14. The propelling section 12 runs on a driving wheel 15 which can be steered by a steering wheel 16 and a castor wheel 17 which automatically sets itself to follow the steering movements dictated by the driving wheel 15. The steering wheel 16 is mounted above a casing 18 which contains an electric driving motor, and beside the casing 18 above the castor wheel 17 is a foot plate 19 on which the operator can stand. The unit 12 is closed in front by a vertical plate 20 which carries the pivot assembly 14. The plate 20 is stiffened in relation to the foot plate 19 by a side plate 21, the vertical front end of which is welded to the plate 20 and which is welded to the side edge of the foot plate. The side of the casing 18 correspondingly stiffens the plate 20 at the other side of the truck.

Figure 2:
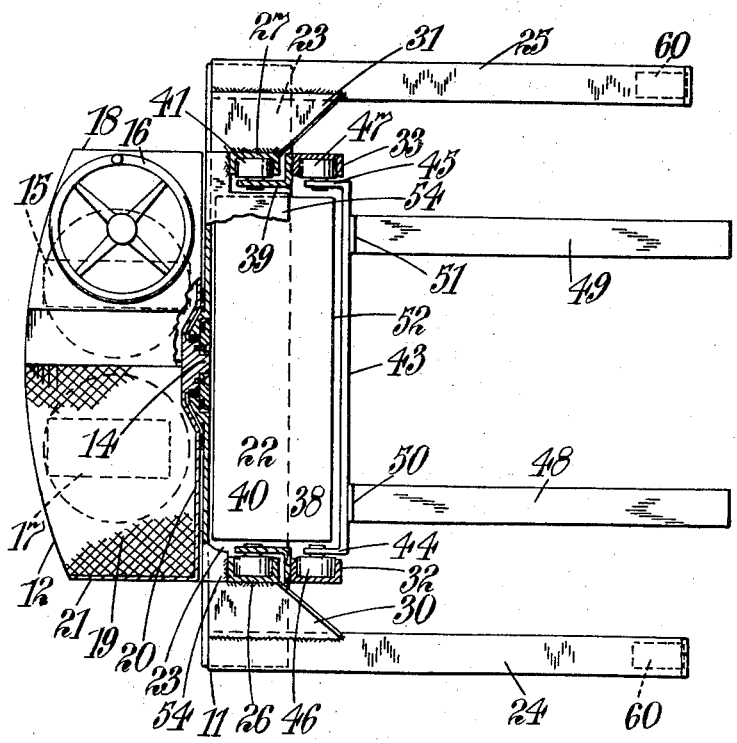
Figure 2 is a horizontal section approximately on the line 2—2 of Figure 1.
Figure 3:
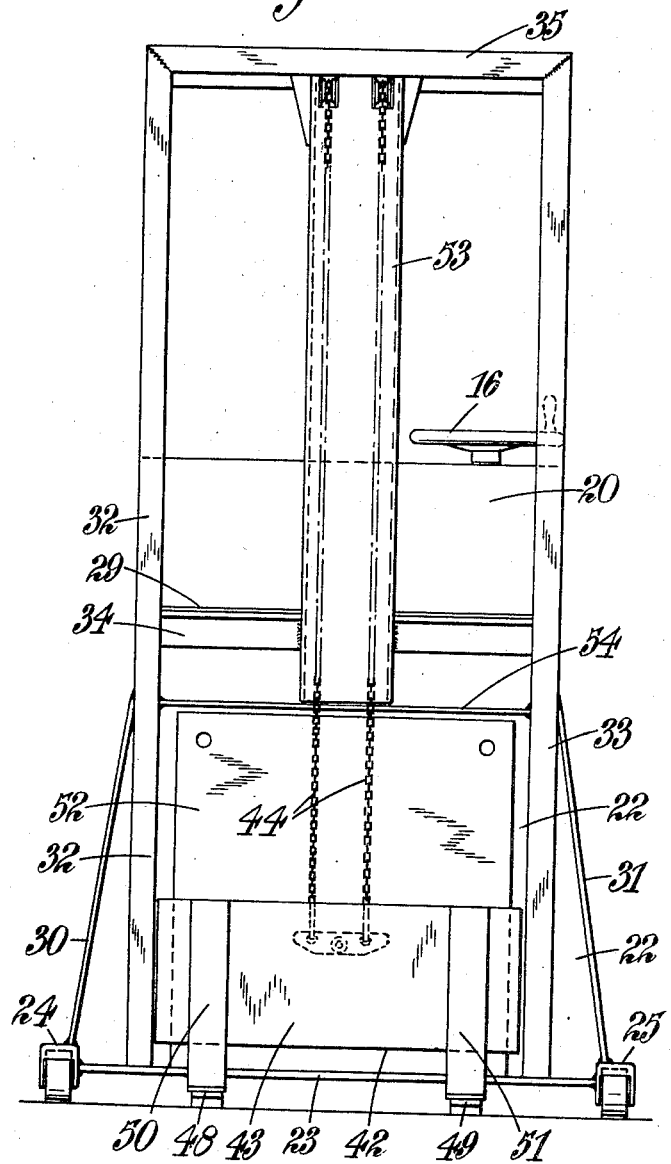
Figure 3 is a front elevation.

The front section 11 of the truck comprises a vertical plate 22 which lies close in front of the plate 20, and is engaged therewith by the pivot assembly 14. The lower edge of the plate 22 is welded to a horizontal shelf-plate 23 which projects forwardly from it, and to the side edges of the shelf-plate 23 there are welded two forwardly projecting straddle legs 24, 25. Also on the shelf 23 there are welded two side members 26, 27 of a fixed mast. The members 26, 27 are channel shaped in cross section as can be seen from Figure 2 of the drawing. They are united together by a cross-member 28 at the top and by an intermediate cross-member 29 lower down. The mast is further considerably stiffened by side gusset plates 30, 31 which connect it to the straddle legs 24 and with the back plate 22. In front of the fixed mast 26 there is a liftable mast consisting of side members 32, 33 united by a cross-member 35 at the top and another cross-member 34 in front of the before-referred to intermediate cross-member of the fixed mast. As can be seen in Figure 2 of the drawing the liftable mast members 32, 33 are slidably connected to the fixed mast members 26, 27 by means of angle-shaped brackets 38, 39 which are narrow, that is of very small dimensions, as viewed in plan so that they do not much encroach on the space between the side members 26, 27 of the fixed mast, and which carry rollers 40, 41 fitting into the grooves of the channel-shaped fixed mast side members. This permits the liftable mast 32, 33 to be supported by the fixed mast members and to run up and down. The movements are effected by a chain mechanism, the details of which are not shown in the drawing, but which may be of any desired or well-known form.

The liftable mast supports a carriage 42 which is formed by a back-plate member 43 extending in a vertical plane just in front of the front plane of the liftable mast, and having side edges which are bent back as shown at 44, 45 and carry rollers 46, 47 to run inside the channels of the liftable mast. The carriage has secured to it L-shaped members, the lower limbs 48, 49 of which are horizontal and extend forwardly, while the rear limbs 50, 51 are vertical and are secured to the plate 43. The carriage can be lifted by hydraulic means connected to chains 84 in known manner.

It will be seen that behind the plate 43 and in front of the plate 22 there is a clear space which provides room for a battery box 52. The back plate 22 is bent forwardly between the mast sides 26, 27 to form a shelf 54 above the battery box 52, and on the shelf 54 the necessary hydraulic equipment for operating the chains 84 and for lifting the mast 32 can be arranged. This hydraulic equipment, however, is not shown in the drawing.

I claim:

1. A goods lifting truck comprising in combination a chassis, a mast mounted on said chassis, said mast comprising two columns spaced apart one on each side of said chassis, a carriage positioned forwardly of said mast, mast engaging connecting members mounted on each side of said carriage, said connecting members extending rearwardly therefrom close to the sides of said columns and carrying rollers engaging said columns, a battery box positioned between said columns and said connecting members engaged therewith a cross member between the sides of the mast above the battery box, and means for raising and lowering said carriage on said mast, such means being located between the sides of said mast above said cross member.

2. A goods lifting truck comprising in combination a chassis having a power driven steerable rear section and a mast section pivotally connected thereto and positioned forwardly of said rear section, a non-lifting mast mounted on said chassis mast section, said non-lifting mast comprising two columns spaced apart one on each side of said chassis mast section, a straddle leg extending forwardly from each side of said chassis mast section and having roller means mounted adjacent the forward end thereof, a back plate extending between said mast columns adjacent the rear thereof, a liftable mast positioned forwardly of said non-lifting mast and having bracket means at each side thereof carrying rollers running on the non-lifting mast, a carriage positioned forwardly of said liftable mast, liftable mast engaging connecting members mounted on each side of said carriage, said connecting members extending rearwardly therefrom close to the sides of said columns and carrying rollers engaging said liftable mast, a battery box positioned between said columns and said bracket means and connecting members forwardly of said back plate a cross member connecting the sides of the non-lifting mast above the battery box, and means for lifting said liftable mast and said carriage, such means being located above said cross member.

3. A goods lifting truck comprising in combination a wheeled chassis, a non-lifting mast on said chassis comprising two columns spaced apart, one on each side of said chassis, a lifting mast in front of said movable mast, a lifting carriage projecting forwardly from said lifting mast, brackets on the lifting mast which extend close to the columns of said non-lifting mast into engagement with guideways thereon, brackets on the carriage engaging guideways on the lifting mast, a battery box supporting shelf on the chassis between the lower part of the sides of the non-lifting mast, a battery box thereon, a shelf supported from the chassis above said battery box, and lifting means for the carriage and lifting mast located above said shelf.

4. A goods lifting truck comprising in combination a chassis having a power driven steerable rear section and a mast section pivotally connected thereto and positioned forwardly of said rear section, a fixed mast mounted on said chassis mast section, said fixed mast comprising two columns spaced apart one on each side of said chassis mast ection, a straddle leg extending forwardly from each side of said chassis mast section and having roller means mounted adjacent the forward end thereof, a back plate extending between said mast columns adjacent the rear thereof, a liftable mast positioned forwardly of said fixed mast and having bracket means at each side thereof carrying rollers running on the fixed mast, a carriage positioned forwardly of said liftable mast, liftable mast engaging connecting members mounted on each side of said carriage, said connecting members extending rearwardly therefrom close to the inner sides of said columns and carrying rollers engaging said liftable mast, a battery box positioned between said columns and said bracket means and connecting members forwardly of said back plate, and means for lifting said carriage and said liftable mast and control means therefor, said control means being positioned above said battery box between said columns.

References Cited in the file of this patent

UNITED STATES PATENTS

| | | |
|---|---|---|
| 2,126,289 | Schroeder | Aug. 9, 1938 |
| 2,528,401 | Ulinski | Oct. 31, 1950 |
| 2,564,002 | Gibson | Aug. 14, 1951 |
| 2,643,740 | Quayle | June 30, 1953 |
| 2,709,015 | Sasgen et al. | May 24, 1955 |
| 2,713,919 | Framhein | July 26, 1955 |